United States Patent [19]

Silverstein et al.

[11] 4,006,378
[45] Feb. 1, 1977

[54] OPTICAL COATING WITH SELECTABLE TRANSMITTANCE CHARACTERISTICS AND METHOD OF MAKING THE SAME

[75] Inventors: Seth D. Silverstein; Jerome S. Prener, both of Schenectady, N.Y.

[73] Assignee: General Electric Company, Schenectady, N.Y.

[22] Filed: Oct. 1, 1975

[21] Appl. No.: 618,671

[52] U.S. Cl. .............................. 313/112; 252/300; 313/221; 350/1; 350/311
[51] Int. Cl.² ..................... G02B 5/20; H01J 61/40
[58] Field of Search ............... 313/112, 221; 350/1, 350/311; 252/300

[56] References Cited
UNITED STATES PATENTS 2,774,903  12/1956  Burns ........................... 313/112 X
3,148,300  9/1964  Graff ............................. 313/112 X
3,676,729  7/1972  Menelly ......................... 313/112 X
3,850,665  11/1974  Plumat et al. ..................... 350/1 X Primary Examiner—Siegfried H. Grimm
Attorney, Agent, or Firm—Jerome C. Squillaro; Joseph T. Cohen

[57] ABSTRACT

A layer of zinc oxide disposed on the surface of a substrate in thicknesses of between 500 and 10,000 Angstroms is characterized by a sharp absorption edge to substantially absorb selected wavelengths of radiation incident thereon while transmitting other selected wavelengths. The wavelength of the absorption edge is selectable as a function of temperature. A method of depositing the zinc oxide layer is also described.

10 Claims, 4 Drawing Figures

U.S. Patent    Feb. 1, 1977    4,006,378
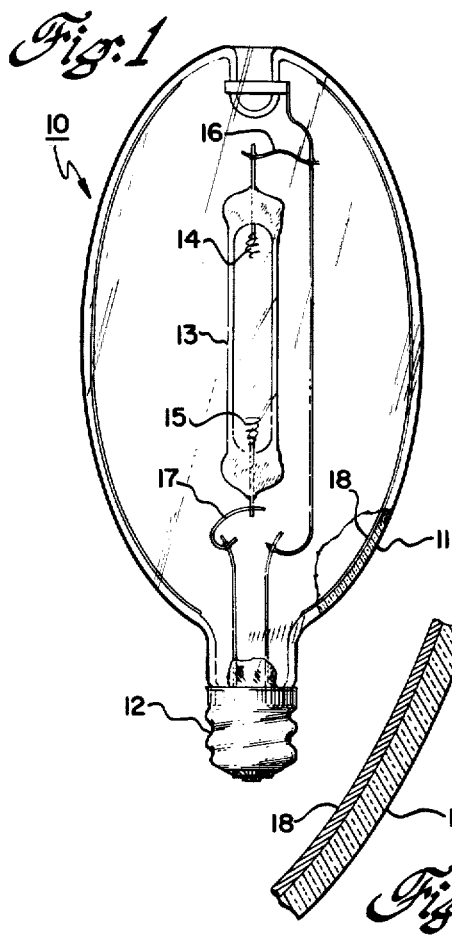
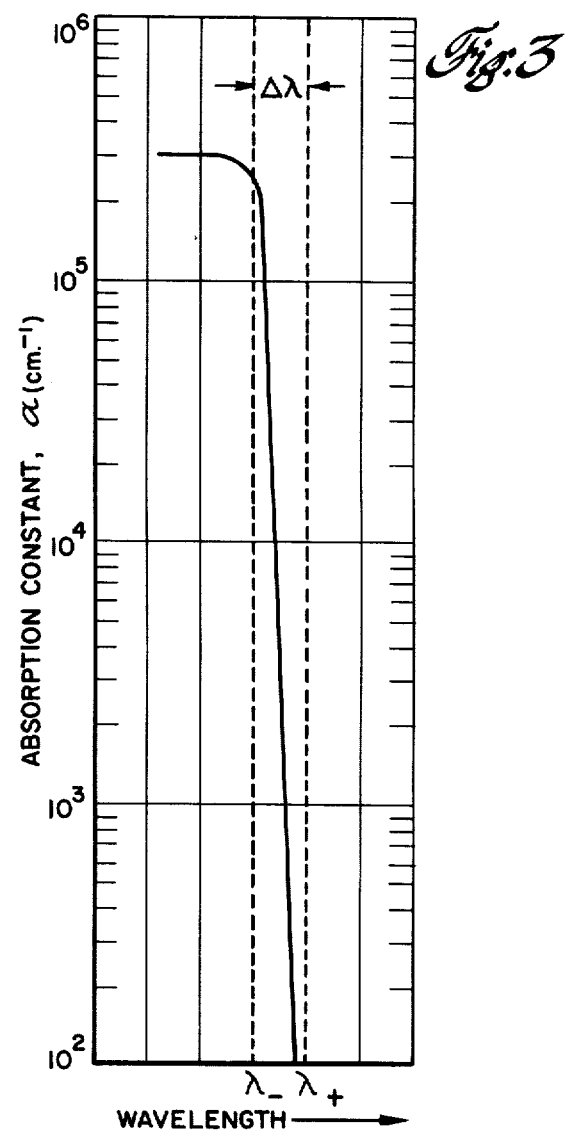
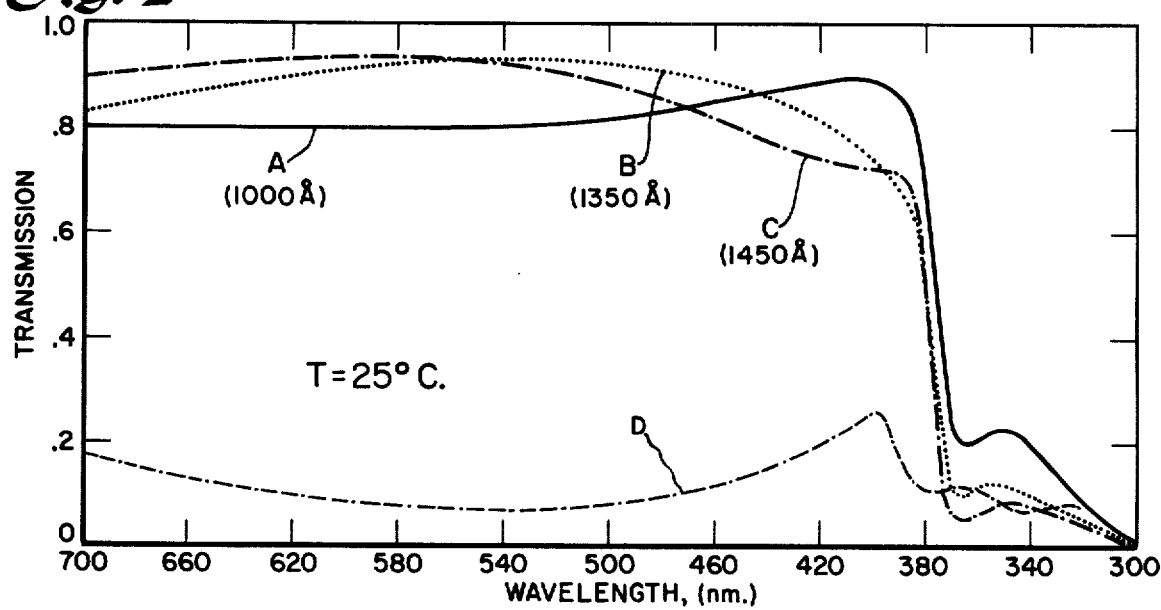

OPTICAL COATING WITH SELECTABLE TRANSMITTANCE CHARACTERISTICS AND METHOD OF MAKING THE SAME

The present invention relates to vapor-arc discharge lamps, and more particularly to optical systems including optical coatings disposed on a light transmissive member such as the interior surface of the envelope of such lamps and methods of depositing such coatings to reduce undesirable ultraviolet radiation from such lamps.

High pressure mercury arc discharge lamps either with a clear or phosphor coated envelope and metallic halide or multivapor lamps, such as those described in U.S. Pat. Nos. 3,234,421 issued to G. H. Reiling, and 3,781,586 issued to P. D. Johnson, include one or more metals as the principal radiating specie to provide a broad emission spectrum. For example, in the Reiling patent, sodium iodide is utilized as the principal radiating specie in the orange-red region of the visible spectrum. The addition of additional iodides, such as for example thallium and indium which emit in the green and blue portions of the visible spectrum, produces a total emission which is a pleasing white or near-white spectral rendition.

In these and other such vapor-arc discharge lamps, the spectral emission generally includes both visible and ultraviolet radiation. The ultraviolet radiation from such lamps has been found to induce photochemical reactions in organic polymer structures, thereby causing discoloration and/or mechanical degradation of the polymer structures. For example, electrical fixture globes made of polycarbonate materials when used in conjunction with mercury vapor lamp sources in lighting fixtures, experience a discoloration and loss of transmittance after only a few months of operation. The photochemical degradation of polymers is primarily due to the photoxidation within the first few mils of the surface of the materials being utilized. Also, the ultraviolet emitted from such lamps can cause color distortion of materials which contain fluorescent dyes. Such undesirable characteristics of these vapor-arc discharge lamps have limited their usage or at least necessitated certain precautionary measures.

In accordance with the present invention, these and other disadvantages are overcome by providing an optical coating along the interior portion of a lamp envelope, which coating substantially attenuates incident ultraviolet radiation without substantially reducing the transmittance of visible radiation. We have found that zinc oxide, a wideband gap semiconductor material, when deposited on the substrate, such as a lamp envelope, in thickness of between 500 Angstroms and 10,000 Angstroms, exhibits a temperature-dependent transmission-absorption characteristic which provides a high degree of transmission of visible light while providing a high degree of absorption for ultraviolet radiation. The transition region between transmission and absorption is defined by a sharp absorption edge which is selectively variable as a function of the temperature of the zinc oxide layer.

Further objects and advantages of the invention, along with a more complete description thereof, are provided in the following detailed description taken in conjunction with the accompanying drawings, in which:

FIG. 1 is an elevation view in cross-section of a portion of a vapor-arc discharge lamp made in accordance with the teachings of this invention;

FIG. 2 is an elevation view in cross-section of a portion of the lamp of FIG. 1 illustrating the teachings of this invention;

FIG. 3 illustrates the absorption edge of zinc oxide as a function of wavelength; and FIG. 4 illustrates the optical transmission and reflection characteristics at constant temperature for varying zinc oxide layer thicknesses.

FIG. 1 illustrates an embodiment of the present invention in which a vapor-arc discharge lamp 10, such as a high-pressure mercury arc lamp or a multivapor lamp, for example, includes an exterior evacuable light-transmissive member or envelope 11 mounted upon a screw-type base 12 which supports within the envelope 11 an inner arc-containing envelope 13. The inner envelope 13, constructed of suitable high temperature and light-transmissive glass, such as fused quartz, high density yttria, or other similar high density, light-transmissive materials. Envelope 11 may be of any suitable high temperature, light-transmissive glass, such as for example, those available commercially under the trade-names of Nonex, Pyrex or Vicor.

Arc-electrodes 14 and 15 are spaced a predetermined distance apart within the envelope 13 and provide the mechanism for sustaining a high current electric arc therebetween in the presence of suitable vaporizable constituents, such as mercury, metallic halides, etc. Arc-electrodes 14 and 15 are connected through electrical conductors 16 and 17, respectively, to contact members in the screw-type base 12. It is to be understood that the illustration of FIG. 1 is merely schematic, and is not intended to include other necessary or desirable elements of a vacuum arc discharge lamp, such as a starting electrode, voltage dropping resistor, etc., since these elements of the lamp form no part of the instant invention, and are hence eliminated for purposes of ease of description.

FIG. 2 illustrates a section of the lamp envelope 11 with a layer 18 of zinc oxide disposed on the inner surface thereof. As pointed out above, zinc oxide is a wideband gap semiconductor material exhibiting a temperature-selectable absorption edge defining a transition region between substantially complete transmission and complete absorption. The relationship between the wavelength, $\lambda$, at which the absorption edge occurs, varies inversely with the bandgap, $E_g$, of the material and is defined by the following equation:

$$\lambda \text{ (nm)} = 1240/E_{g(ev)}$$

Since the bandgap of the material varies with temperature, T, in accordance with the following relationship $$E_{g(ev)} = 3.22 - 9.5 \times 10^{-4} (T \text{ (}°k\text{)} - 293)$$

it can be appreciated that as the temperature of the material is varied, so is the wavelength of the absorption edge.

FIG. 3 illustrates the position of the absorption edge characteristic for thin layers, ie., 500 to 10,000 Angstroms of zinc oxide. From this illustration, it can be appreciated that the transition from substantially complete transmission to substantial attenuation occurs over a very narrow wavelength, $\Delta\lambda$, and is approximately 10 nanometers. While the width of the absorption edge given by Δλ is substantially constant, the wavelength at which the transition occurs varies in accordance with the foregoing equations. Table 1 below summarizes the variation in absorption edge at 20° C, 200° C, 300° C, 400° C and 500° C for the aforementioned thin layers of zinc oxide.

TABLE 1

| Temperature (° C) | λ− (Nanometers) | λ+ (Nanometers) |
| --- | --- | --- |
| 20 | 376 | 387 |
| 200 | 401 | 412 |
| 300 | 413 | 425 |
| 400 | 428 | 440 |
| 500 | 453 | 465 |

We have found that the foregoing characteristics of thin layers of zinc oxide are particularly useful in reducing undesirable ultraviolet radiation from vapor-arc lamps without appreciably altering the visible light output from the lamp. For example, high pressure mercury vapor arc lamps generally exhibit a spectral radiation pattern exemplified by visible spectral lines at approximately 405, 440, 550, and 570 nanometers. At the same time, such lamps also emit ultraviolet radiation with strong lines at 365 and 313 nanometers. By utilizing a thin zinc oxide layer on the interior surface of the lamp envelope, it is possible to substantially attenuate the ultraviolet radiation at 365 and 313 nanometers without substantially attenuating the visible spectral output from the lamp. More specifically and in accordance with the criteria set forth above, it is possible to substantially attenuate a typical 405 nanometer mercury line by maintaining the zinc oxide layer at approximately 300° C. At this temperature, the absorption edge has a transition between approximately 413 and 425 nanometers. Hence, the 405 nanometer mercury line along with all other shorter wavelengths are substantially attenuated. Those skilled in the art can readily appreciate that the selection of envelope temperature can be achieved in a variety of ways. For example, the envelope size could be altered, the partial presssure of the constituent gases contained within the arc discharge envelope, and the type of gases contained therein, the spacing of the arc-electrodes, and numerous other parameters of the lamp which affect temperature.

In general, we have found that the useful range of temperatures for practicing our invention with a high pressure mercury lamp, for example, is between approximately 100° C and 500° C; however, a preferred range is between approximately 200° C and 400° C.

From the description thus far, it is apparent that the ability to vary the absorption edge as a function to temperature enables the lamp designer to substantially eliminate undesirable ultraviolet radiation as well as short wavelength visible radiation from vacuum arc discharge lamps. However, of equal importance to the designer is the necessity of maintaining high transmission of the visible spectrum through the glass envelope and the zinc oxide layer. Obviously, those skilled in the art can readily appreciate that the desirable absorption edge characteristics would render a vapor arc lamp commercially unacceptable for many applications if the visible light output therefrom were substantially reduced. Hence, the thickness of the zinc oxide layer is critical to the commercial acceptability of a vapor arc lamp including a zinc oxide coating on the interior surface of the lamp envelope.

In accordance with another aspect of this invention which is most easily understood by reference to FIG. 4 of the drawing, it can be seen that the transmittance and reflectance of a layer of zinc oxide as a function of wavelength varies with the thickness of the zinc oxide in accord with the wellknown laws of optics regarding interference effects in thin films. More specifically, FIG. 4 illustrates by way of example, transmittance for zinc oxide thicknesses of 1000, 1350, and 1450 Angstroms at a zinc oxide temperature of approximately 25° C and the reflectance of a 1350 Angstrom thick zinc oxide film also at 25° C. The characteristic transmittance curves of these three zinc oxide layer thicknesses are indicated by the letters A, B, and C for the layer thicknesses of 1000, 1350, and 1450 Angstroms, respectively. The characteristic reflectance curve for a zinc oxide thickness of 1350 Angstroms is indicated by the letter D.

An observation of the curves illustrated in FIG. 4 illustrates a variation in the transmittance maxima of each thickness with wavelength. More specifically, Curve A illustrates a transmittance maximum at approximately 400 nanometers; Curve B a transmittance maximum at approximately 540 nanometers; and Curve C a transmittance maximum at approximately 580 nanometers. FIG. 4 also illustrates with Curve D that the reflectance minimum of the 1350 159 A -film occurs at 540 nanometers. Further, it is seen that the sum of the reflectance and the transmittance of the 1350 Angstrom layer add to one throughout the visible part of the spectrum from 400 to 700 nanometers. The same is true for the other thicknesses whose reflectance curves are not illustrated in FIG. 4 for the sake of clarity. Although FIG. 4 illustrates the transmittance and reflectance at room temperature, these will not change substantially with temperature in the wavelength range of 450 to 700 nanometers. The fact that the sum of the reflectance and transmittance add to unity indicates that the zinc oxide films are nonabsorbing throughout the visible spectrum and should not therefore of itself lead to a decrease in the luminosity of a lamp containing a zinc oxide coating on the outer envelope when compared to an uncoated lamp envelope. The lamp, however, contains within the envelope light absorbing elements, such as illustrated in FIG. 1 by the base 12, supporting leads 16 and 17, as well as other mechanical supports of the arc tube not illustrated in FIG. 1. A high reflectance of the zinc oxide layer for a given wavelength would result in the reflectance of light of this wavelength back into the space within the envelope and its partial absorption by the light absorbing elements just described. This would lead to a decrease in the luminosity of a lamp containing a film of zinc oxide on its outer envelope as compared to a lamp containing an uncoated envelope. Since, for example, a mercury arc emits spectral lines with high luminosity at approximately 440, 550, and 570 nanometers, one would choose a zinc oxide layer thickness of 1350 Angstroms. For phosphor coated high pressure mercury arc lamps or for multivapor lamps whose predominant colors may be at other wavelengths, films of other thicknesses can be chosen so as to maximize the luminosity of a lamp and improve color through the reflection and subsequent absorption of less desirable wavelengths.

In practicing our invention, a useful range of thicknesses for the zinc oxide layer range between approximately 500 and 10,000 Angstroms. Thicknesses of less than 500 Angstroms generally do not provide the desired degree of absorption of ultraviolet radiation. Thicknesses greater than 10,000 Angstroms fail to provide any substantial improvement over lesser thicknesses and hence are generally uneconomical and further can be subject to peeling from the envelope surface. Accordingly, in practicing our invention, zinc oxide layer thicknesses of between 500 and 10,000 Angstroms represent a useful range of thicknesses. Within this range, there is a preferred range of thicknesses of between approximately 1000 and 1500 Angstroms which is particularly useful in conjunction with vacuum arc discharge lamps of the general type described above.

In accordance with yet another aspect of our invention, the deposition or application of zinc oxide layers of substantially uniform and selectable thicknesses are provided in accordance with the process now to be described. Specifically, the lamp envelope is heated to a temperature of approximately 500° C, either by a gas flame or by an electric resistance furnace, for example, while an aqueous solution of a zinc-containing material is sprayed into the envelope. The zinc-containing material is preferably one which upon contacting the heated envelope volatilizes, leaving a residual deposit of zinc oxide on the inner envelope surface. Materials suitable for this application include zinc acetate dihydrade, zinc nitrate hexahydrate, and zinc sulfate. By way of specific example, a lamp envelope heated to a temperature of 500° C, is sprayed with a 10% aqueous solution of zinc acetate dihydrate maintained at a pressure of approximately 10 psig for a period ranging from approximately 10 to 14 seconds, depending on the coating thickness required while the envelope is rotated about its major axis at a rate of approximately 100 revolutions per minute, for example. The spraying is accomplished with a simple glass atomizer, such as that available from Ace Glass, Inc., Chromatographic Spray, Catalog No. 5917, with the zinc oxide coating forming immediately upon contact with the heated glass envelope. The thickness of the zinc oxide coating is easily monitored by observing the interference colors in a reflected light. For example, a spray time of 10 seconds produces a thickness of approximately 1000 Angstroms, which thickness is observed by a yellow interference color. A 12 second spray produces a zinc oxide thickness of 1350 Angstroms and is observed by a purple interference color. Similarly, a 14 second spray produces a zinc oxide thickness of approximately 1450 Angstroms and is observed by a blue interference color. Those skilled in the art can readily appreciate that other thicknesses will exhibit still other interference colors and the specific thickness and interference color related thereto are readily ascertainable by those skilled in the art.

Although the invention has been particularly described with reference to vacuum arc lamps and the like, the use of zinc oxide in the thicknesses and at the temperatures described above has wider application. For example, the aforementioned zinc oxide coatings may be utilized in all optical systems which require a selectively variable absorption edge and selectable transmission characteristics. Accordingly, it will be apparent to those skilled in the art that various modifications and changes may be made within the spirit and scope of the present invention. The appended claims are therefore intended to cover all such modifications and variations.

What we claim as new is:

1. In combination with a high intensity lamp including a source of radiant energy sealed within the lamp envelope and wherein said radiant energy is characterized by visible and ultraviolet radiation, the improvement comprising:
   a layer of zinc oxide disposed on at least a selected portion of the inner surface of said lamp envelope, said layer having a thickness of between 500 and 10,000 Angstroms and the operating temperature of said layer being selected to cause said layer to exhibit a sharp absorption edge at a selected wavelength, whereby selected wavelengths of said ultraviolet radiation are absorbed while selected wavelengths of said visible radiation are transmitted.

2. The combination of claim 1 wherein said absorption edge is selectable over a range of wavelengths between approximately 400 and 465 nanometers that varies as the temperature of said layer varies between approximately 200 and 500° C.

3. The combination of claim 1 wherein the thickness of said layer is between 1000 and 1500 Angstroms.

4. The combination of claim 1 wherein said lamp is a mercury arc lamp and the thickness of said layer is approximately 1350 Angstroms, the thickness at which said layer exhibits a maximum transmission characteristic.

5. The combination of claim 4 wherein the temperature of said zinc oxide layer is approximately 300° C.

6. An optical system comprising:
   a source of radiant energy including visible and ultraviolet radiation;
   a substantially transmissive member interposed in the path of said radiant energy; and
   a layer of zinc oxide disposed on a selected surface of said member, said layer of zinc oxide having a thickness the operating temperature of said layer being selected to cause said layer to exhibit a sharp absorption edge at a selected wavelength.

7. The optical system of claim 6 wherein said source is a vacuum-arc discharge lamp.

8. The optical system of claim 7 wherein said member is the envelope containing said lamp and said zinc oxide is disposed on the inner surface of said envelope.

9. The optical system of claim 8 wherein said zinc oxide layer has a thickness of between 1000 and 1500 Angstroms.

10. The optical system of claim 9 wherein the heat generated by said lamp maintains the temperature of said zinc oxide layer between 200° C and 400° C.

* * * * *